United States Patent
Li et al.

(10) Patent No.: US 10,563,119 B2
(45) Date of Patent: Feb. 18, 2020

(54) METHODS FOR PRODUCING SEAWATER BASED, HIGH TEMPERATURE VISCOELASTIC SURFACTANT FLUIDS WITH LOW SCALING TENDENCY

(71) Applicant: Saudi Arabian Oil Company, Dhahran (SA)

(72) Inventors: Leiming Li, Sugar Land, TX (US); Feng Liang, Cypress, TX (US); Tao Chen, Dhahran (SA)

(73) Assignee: Saudi Arabian Oil Company, Dayton (SA)

(*) Notice: Subject to any disclaimer, the term of this patent is extended or adjusted under 35 U.S.C. 154(b) by 159 days.

(21) Appl. No.: 15/661,596

(22) Filed: Jul. 27, 2017

(65) Prior Publication Data

US 2019/0031949 A1   Jan. 31, 2019

(51) Int. Cl.
  *C09K 8/68* (2006.01)
  *C09K 8/60* (2006.01)

(52) U.S. Cl.
  CPC ............. *C09K 8/68* (2013.01); *C09K 8/602* (2013.01); *C09K 8/604* (2013.01); *C09K 2208/30* (2013.01)

(58) Field of Classification Search
  None
  See application file for complete search history.

(56) References Cited

U.S. PATENT DOCUMENTS

| | | | |
|---|---|---|---|
| 3,401,094 A | 9/1968 | Lindsay, Jr. | |
| 4,930,575 A | 6/1990 | Falk | |
| 7,081,439 B2 | 7/2006 | Sullivan et al. | |
| 7,244,694 B2 | 7/2007 | Fu et al. | |
| 7,380,606 B2 | 7/2008 | Pursley et al. | |
| 7,392,848 B1 | 7/2008 | Bader | |
| 7,461,694 B2 | 12/2008 | Dahanayake et al. | |
| 7,703,531 B2 | 4/2010 | Huang et al. | |
| 9,080,043 B2 | 7/2015 | Yuan-Huffman et al. | |
| 9,341,052 B2 | 5/2016 | Gadberry et al. | |

(Continued)

FOREIGN PATENT DOCUMENTS

CN   105112041 A   12/2015
EP   1634938 A1   3/2006

(Continued)

OTHER PUBLICATIONS

U.S. Non-Final Office Action dated Oct. 26, 2017 pertaining to U.S. Appl. No. 15/581,408, 14 Pages.

(Continued)

*Primary Examiner* — John J Figueroa
(74) *Attorney, Agent, or Firm* — Dinsmore & Shohl, LLP (57) ABSTRACT

Embodiments of the present disclosure are directed to a method of producing a viscoelastic surfactant (VES) fluid, the VES fluid comprising desulfated seawater. The method of producing the VES fluid comprises adding an alkaline earth metal halide to seawater to produce a sulfate precipitate. The method further comprises removing the sulfate precipitate to produce the desulfated water. The method further comprises adding a VES and one or more of a nanoparticle viscosity modifier or a polymeric modifier to the desulfated seawater. Other embodiments are directed to VES fluids that maintain a viscosity greater than 10 cP at temperatures above 250° F.

14 Claims, 2 Drawing Sheets

(56) References Cited

U.S. PATENT DOCUMENTS

| | | |
|---|---|---|
| 2005/0107265 A1 | 5/2005 | Sullivan et al. |
| 2005/0119401 A1 | 6/2005 | Bavouzet et al. |
| 2006/0046937 A1 | 3/2006 | Fu et al. |
| 2006/0054324 A1* | 3/2006 | Sullivan .................. C09K 8/52 166/308.1 |
| 2008/0153720 A1 | 6/2008 | Huang et al. |
| 2008/0182762 A1* | 7/2008 | Huang .................... C09K 8/68 507/213 |
| 2008/0190615 A1 | 8/2008 | Drochon |
| 2009/0111716 A1 | 4/2009 | Hough et al. |
| 2010/0022418 A1 | 1/2010 | Milne et al. |
| 2013/0274170 A1 | 10/2013 | Yuan-Huffman et al. |
| 2014/0076572 A1 | 3/2014 | Gadberry et al. |
| 2015/0315457 A1 | 11/2015 | Ali et al. |
| 2015/0368547 A1 | 12/2015 | Lesko et al. |
| 2016/0017210 A1* | 1/2016 | Li .......................... C09K 8/035 166/308.2 |
| 2016/0176734 A1 | 6/2016 | Wahid |
| 2016/0355723 A1 | 12/2016 | Yadav et al. |
| 2016/0356107 A1 | 12/2016 | Sarmah et al. |
| 2017/0197853 A1 | 7/2017 | Chudasama et al. |

FOREIGN PATENT DOCUMENTS

| | | |
|---|---|---|
| WO | 03056130 A1 | 7/2003 |
| WO | 2008036812 A2 | 3/2008 |
| WO | 2008100436 A1 | 8/2008 |
| WO | 2008151331 A1 | 12/2008 |
| WO | 2012160008 A1 | 11/2012 |
| WO | 2013036415 A2 | 3/2013 |
| WO | 2014140055 A1 | 9/2014 |
| WO | 2016083318 A1 | 6/2016 |
| WO | 2016083322 A1 | 6/2016 |
| WO | 2016196812 A1 | 12/2016 |

OTHER PUBLICATIONS

Final Office Action dated Mar. 9, 2018 pertaining to U.S. Appl. No. 15/581,408, filed Apr. 28, 2017, 9 pages.

Hull, et al. "Recent Advances in Viscoelastic Surfactants for Improved Production from Hydrocarbon Reservoirs" Society of Petroleum Engineers, SPE International Symposium on Oil Field Chemistry held Apr. 13-15, 2017.

International Search Report and Written Opinion pertaining to PCT/US2017/031201 dated Jun. 20, 2017.

International Search Report and Written Opinion pertaining to PCT/US2017/031195 dated Jul. 12, 2017.

U.S. Office Action dated Mar. 15, 2019 pertaining to U.S. Appl. No. 15/581,449 filed Apr. 28, 2017, 27 pgs.

International Search Report and Written Opinion pertaining to International Application No. PCT/US2018/040199 filed Jun. 29, 2018, 18 pages.

Notice of Allowance and Fees(s) Due dated May 6, 2019 pertaining to U.S. Appl. No. 15/581,449, filed Apr. 28, 2017, 9 pgs.

Office Action dated Apr. 28, 2019 pertaining to Gulf Cooperation Council Application No. 2017/33396.

* cited by examiner (A)

METHODS FOR PRODUCING SEAWATER BASED, HIGH TEMPERATURE VISCOELASTIC SURFACTANT FLUIDS WITH LOW SCALING TENDENCY

BACKGROUND

Technical Field

This disclosure relates to fluids used in fluid injection operations. More specifically, this disclosure relates to viscoelastic surfactant fluids used in fluid injection operations including hydraulic fracturing operations.

Background

Viscoelastic surfactant (VES) molecules form elongated, flexible, wormlike micelles in solution. These wormlike micelles form three-dimensional networks that cause limited motility of water molecules, resulting in a viscoelastic gel. The resulting viscoelastic gels, also known as a VES fluids, have long been used in hydrocarbon wellbore-related fluid injection operations such as fracturing, completion, acidizing, sand control, and water shutoff. VES fluids exhibit superior proppant suspending, carrying ability, and very low formation damage compared to other treatment fluids making them favorable for fluid injection operations.

In certain hydrocarbon wellbore-related operation conditions, fresh water is not readily available to produce VES fluids. For example, deep sea oil drilling operations and some coastal drilling operations have limited access to fresh water, but access to an abundance of seawater. In such situations, it may be desirable to make VES fluids with seawater rather than importing large quantities of fresh water. But, fluids produced with natural seawater may be problematic for use in injection operations due to the presence of incompatible ions.

Seawater contains ions that are incompatible with formation waters, that is, the water in the earth surrounding a wellbore. Incompatibility between injection fluids and formation waters can cause scaling in wellbores and on drilling equipment. Seawater contains several ions including, but not limited to, calcium, magnesium, sodium, chloride, and sulfate. Formation water, the water surrounding the wellbore, often contains barium (Ba) and strontium (Sr). Seawater could have a sulfate concentration greater than 4,000 milligrams per liter (mg/L). When conventional seawater-based VES fluids are used in water injection operations, the sulfate in the seawater reacts with barium ions in the formation water. This reaction produces a solid sulfate precipitates such as $BaSO_4$, $SrSO_4$, or combinations thereof. The precipitated sulfates can buildup in wellbores and on drilling equipment; this buildup is also known as scaling.

Scaling can cause the shutdown of wellbores and shorten wellbore lifetime. Current solutions to scaling involve treatments after the scaling occurs. These treatments can increase operating cost and permanently decrease wellbore productivity. Scale remediation is less desirable than scale prevention. First, remediation techniques may damage the wellbore and permanently decrease wellbore productivity and shorten wellbore life. Second, stopping a drilling operation to repair scale damage can exacerbate the scale damage. A stopped wellbore loses pressure and cools down, precipitating even more sulfate scales. Therefore, preventing scaling is critical to operating an efficient wellbore in an environment without excess freshwater.

Further, current VES fluids made from seawater operate at a maximum temperature of approximately 250 degrees Fahrenheit (° F.). At temperatures greater than 250° F. the viscosities of conventional VES fluids could drop below 10 centipose (cP) to lose the designed functions. VES fluids with a viscosity below 10 cP (at a shear rate of 100 s$^{-1}$) may be unsuitable for fluid injection operations.

SUMMARY

Accordingly, there exists a need for a method to create a VES fluid using seawater that prevents scaling from occurring. In order to prevent scaling from occurring, embodiments of the present disclosure desulfate seawater for use in the production of fluids for fluid injection operations. Here, to desulfate means to remove all or part of the sulfate ions from a water sample. The desulfated seawater can be used in the production of VES fluids. The VES fluids made with desulfated seawater have a relatively low sulfate concentration, inhibiting the formation of $BaSO_4$ and $SrSO_4$ scaling.

Embodiments of the present disclosure are directed to a method of producing a viscoelastic surfactant (VES) fluid, the VES fluid comprising desulfated seawater. The method of producing the VES fluid comprises adding an alkaline earth metal halide to seawater to produce a sulfate precipitate. The method further comprises removing the sulfate precipitate to produce the desulfated water. The method further comprises adding a VES and one or more of a nanoparticle viscosity modifier or a polymeric viscosity modifier like a polyacrylamide or acrylamide copolymer viscosity modifier to the desulfated seawater.

VES fluids should maintain a viscosity of at least above about 10 cP to be suitable for fluid injection operations. Conventional VES fluids decrease in viscosity to below 10 cP at temperatures greater than 250° F. There exists a need for a VES fluid comprising seawater that can maintain a viscosity above about 10 cP at a temperature above 250° F., above 300° F., or above 350° F.

Embodiments of the present disclosure are also directed towards VES fluids that maintain a viscosity of greater than 10 cP at temperatures above 250° F. The VES fluids may comprise a viscoelastic surfactant, desulfated seawater, and at least one stabilizing calcium salt. The VES fluids may further comprise a nanoparticle viscosity modifier or a polymeric like polyacrylamide viscosity modifier.

Additional features and advantages of the described embodiments will be set forth in the detailed description which follows, and in part will be readily apparent to those skilled in the art from that description or recognized by practicing the described embodiments, including the detailed description which follows, the claims, as well as the appended figures

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to VES fluids for use in hydrocarbon wellbore-related fluid injection operations. Fluid injection operations include treatments of underground oil and gas bearing formations, such as fracturing, completion, acidizing, sand control, and water shutoff. The present disclosure generally relates to VES fluids comprising seawater and to methods of their formulation. This disclosure describes a VES fluid that maintains a suitable viscosity at temperatures greater than 250° F. In the context of this disclosure, a suitable viscosity is a viscosity greater than or equal to about 10 cP as measured by the American Petroleum Institute Recommended Practice 39 ("API RP 39") entitled "Recommended practices on measuring the viscous properties of a cross-linked water-based fracturing fluid." To measure the viscosity of a VES fluid sample under the conditions designed to simulate those in a high temperature and high pressure subterranean reservoir formation, 52 mL of the fluid sample was placed into a Fann50-type viscometer such as Grace M5600 HPHT rheometer. Tests were performed at the bottomhole temperature, following the API RP 39 schedule and under about 400 psi of nitrogen. The bottomhole temperature refers to the temperature in the borehole at total depth at the time it is measured. The API RP 39 schedule consisted of continuous fluid shearing at 100/s shear rate and a series of shearing ramps at 100, 75, 50, 25, 50, 75, and 100/s once the fluid temperature was within 5° F. of the bottomhole temperature and occurring periodically for every 30 minutes.

In one embodiment, a method may include producing a viscoelastic fluid comprising desulfated seawater. The method may comprise adding an alkaline earth metal halide to seawater to produce a sulfate precipitate. The method may further comprise removing the sulfate precipitate to produce desulfated seawater. The method may further comprise adding a viscoelastic surfactant, and one or more of a nanoparticle viscosity modifier or a polymeric viscosity modifier to the desulfated seawater. The viscoelastic surfactant may have a general formula (I):

(I)

where $R_1$ is a saturated or unsaturated hydrocarbon group of from 17 to 29 carbon atoms, $R_2$ and $R_3$ are each independently selected from a straight chain or branched alkyl or hydroxyalkyl group of from 1 to 6 carbon atoms, $R_4$ is selected from H, hydroxyl, alkyl or hydroxyalkyl groups of from 1 to 4 carbon atoms; k is an integer of from 2-20; m is an integer of from 1-20; and n is an integer of from 0-20.

The calcium ions that remain in solution from the desulfation process surprisingly stabilize the viscoelastic surfactant three-dimensional micelle network and maintain a suitable viscosity of at least 10 cP at temperatures greater than or equal to 250° F.

In one or more embodiments, the VES with the general formula I has an $R_1$ that is a saturated or unsaturated hydrocarbon group of from 17 to 29 carbon atoms. In other embodiments, $R_1$ is a saturated or unsaturated, hydrocarbon group of 18 to 21 carbon atoms. $R_1$ may be restricted to a single chain length or may be of mixed chain length such as those groups derived from natural fats and oils or petroleum stocks. The natural fats and oils or petroleum stocks may comprise tallow alkyl, hardened tallow alkyl, rapeseed alkyl, hardened rapeseed alkyl, tall oil alkyl, hardened tall oil alkyl, coco alkyl, oleyl, erucyl, soya alkyl, or a combination thereof.

In one embodiment, the general formula I of the viscoelastic surfactant, $R_2$ and $R_3$ are each independently selected from a straight chain or branched alkyl or hydroxyalkyl group of from 1 to 6 carbon atoms, in other embodiments from 1 to 4 carbon atoms, and in another embodiment from 1 to 3 carbon atoms. $R_4$ is selected from H, hydroxyl, alkyl or hydroxyalkyl groups of from 1 to 4 carbon atoms, and can be selected from methyl, ethyl, hydroxyethyl, hydroxyl or methyl, but is not limited to this list of groups.

The general formula I has the variables k, m, and n. In one embodiment, k is an integer of from 2-20, in other embodiments, from 2 to 12, and in another embodiment from 2 to 4. The m is an integer of from 1-20, in other embodiments from 1 to 12, in another embodiment from 1 to 6, and in some embodiments, m can also be an integer from 1 to 3. Finally, n is an integer from 0 to 20, from 0 to 12, or from 0 to 6. In some embodiments, n is an integer from 0 to 1.

In one embodiment, the VES is erucamidopropyl hydroxypropylsultaine, commercially available as Armovis EHS, provided by Akzo Nobel. Various amounts of VES in the VES fluid are contemplated. In one or more embodiments, the viscoelastic surfactant fluid comprises from 0.1 vol. % to 20 vol. % viscoelastic surfactant based on the total volume of the VES fluid. In other embodiments, the viscoelastic surfactant fluid comprises from 0.01 vol. % to 30 vol. %; from 0.1 vol. % to 25 vol. %; from 0.1 vol. % to 10 vol. %; from 0.1 vol. % to 5 vol. %; from 1 vol. % to 10 vol. %; or from 1 vol. % to 5 vol. %.

The viscoelastic surfactant fluid may further comprise desulfated seawater and at least one stabilizing calcium salt. The viscoelastic surfactant fluid may further comprise one or more of a nanoparticle viscosity modifier or a polymeric viscosity modifier. The nanoparticle viscosity modifier may have a particle size of 0.1 to 500 nanometers (nm). The polymeric viscosity modifier contains polyacrylamide or acrylamide copolymer viscosity modifier that may have a weight average molecular weight ($M_w$) of from 250,000 grams per mole (g/mol) to 40,000,000 g/mol.

The addition of an alkaline earth metal halide to seawater increases the calcium concentration of the seawater and will produce a sulfate precipitate. Suitable alkaline earth metal halides include, by way of non-limiting example, $CaCl_2$, $CaBr_2$, or $CaI_2$. In one embodiment, the alkaline earth metal halide is added to a final concentration of from 5 percent by total weight (wt. %) to 50 wt. % based on the total weight of the desulfated seawater solution. In other embodiments, the alkaline earth metal halide may be added to a final concentration of from 10 wt. % to 40%; from 10 wt. % to 30 wt. %; from 20 wt. % to 50 wt. %; or from 30 wt % to 40 wt. % based on the total weight of the desulfated seawater solution.

Alkaline earth metal halides have a generally high solubility in water. For example, $CaCl_2$ has a maximum solubility of 745 grams per liter (g/L) in 20° C. water. By contrast, $CaSO_4$ has a relatively low solubility in water. Calcium sulfate has a maximum solubility of 2.1 g/L in 20° C. water. The relative solubilities of $CaCl_2$ and $CaSO_4$ mean that when enough $CaCl_2$ is added to a solution containing sulfate ions, $CaSO_4$ will fall out of solution, or precipitate. Chemical equation 1 shows this chemistry.

$$CaCl_{2(s)} + SO_{4(aq)}^{2-} \rightarrow CaSO_{4(s)} + 2Cl_{(aq)}^{-} \qquad \text{Eq. (1)}$$

Another way to compare the relative solubilities of $CaCl_2$ and $CaSO_4$ is to look at their solubility expressions and solubility product constants. The solubility product constant ($K_{sp}$) is the equilibrium constant for a substance dissolving in an aqueous solution. The higher the $K_{sp}$ of a substance, the more soluble the substance. $K_{sp}$ can be expressed as the product of the concentration of the dissociated ions in a saturated solution. For example, the $K_{sp}$ of $CaSO_4$ could be expressed as $K_{sp}=[Ca^{2+}][SO_4^{2-}]$ where $[Ca^{2+}]$ and $[SO_4^{2-}]$ represent the ion concentrations at saturation.

In one or more embodiments, CaO is added with the alkaline earth metal halide. The added CaO increases the $Ca^{2+}$ concentration of the seawater, therefore precipitating out more $CaSO_4$. The dissociation of CaO is also an exothermic reaction; the heat generated from the reaction is also useful in facilitating the dissolution of calcium ions.

The removal of $CaSO_4$ precipitate is necessary to produce desulfated water. In one embodiment, the $CaSO_4$ precipitate is removed by filtration. In other embodiments, the $CaSO_4$ precipitate is removed by one or more of filtration, centrifuging, flocculation, agglomeration, coagulation, or coalescence.

A method of producing a viscoelastic surfactant fluid comprising desulfated seawater may further comprise adding a VES and one or more of a nanoparticle viscosity modifier or a polymeric modifier including polyacrylamide viscosity modifier to desulfated seawater. Generally, VES fluids break down and lose viscosity at temperatures greater than 250° F. VES fluids are viscous because of a three dimensional VES micelle structure throughout the fluid. At temperatures above 250° F., the kinetic energy of the VES fluid system increases to the point where the three dimensional VES micelle network loses thermodynamic stability. In embodiments, the VES of general formula (I) together with one or more of a nanoparticle viscosity modifier or a polymeric viscosity modifier stabilize the three dimensional VES micelle network at temperatures greater than 250° F.

By removing the sulfate from the seawater, the water can be used in the formulation of VES fluids without the costs and risks of scaling. By adding excess alkaline earth metal halide to the seawater, any sulfates in solution will associate with the calcium and precipitate out. This solid $CaSO_4$, once precipitated, can be removed from the water. The desulfated water can then be used in a VES fluid without causing scaling when introduced to the formation water.

Not all calcium added to the saltwater is consumed in the association reaction with sulfate. An excess of calcium remains in solution. This calcium chloride serves a second function as stabilizing the VES. At high temperatures, the wormlike micelles formed by the VES are more stable with alkali earth metals, such as calcium. Without being limited by theory, it is believed the calcium ions can strengthen the three dimensional micelle network.

The viscosity of a viscoelastic fluid may vary with the stress or rate of strain or shear rate applied. In the case of shear deformations, it is very common that the viscosity of the fluid drops with increasing shear rate or shear stress. This phenomenon is known as "shear thinning." Surfactants can cause viscoelasticity in fluids and may manifest shear thinning behavior. For example, when viscoelastic fluid is passed through a pump or is in the vicinity of a rotating drill bit, the viscoelastic fluid is in a higher shear rate environment and the viscosity is decreased, resulting in low friction pressures and pumping energy savings. When the shear stress is removed, the fluid returns to a higher viscosity condition, functioning to transport and place proppant.

At elevated temperatures, the average kinetic energy of the molecules in the fluid increases, causing more disruptions to the VES micelle structures and the attractions among the micelles. This can lower the overall viscosity of the fluid. Generally speaking, an increase in temperature correlates to a logarithmic decrease in the time needed to impart equal strain under a constant stress. In other words, it takes less work to stretch a viscoelastic material an equal distance at a higher temperature than it does at a lower temperature. The presence of an alkali calcium stabilizing salt in combination with the addition of one or more of nanoparticles and polymers to the fluid may further improve the VES fluid viscosity at elevated temperatures.

In one or more embodiments, the VES fluid may by enhanced with nanoparticle viscosity modifiers to increase the viscosity of the VES fluid. Without being limited by theory, it is believed the selected nanoparticles associate with the VES micelles to more efficiently form a three dimensional micelle network. The presence of the selected nanomaterials could render enhanced interconnected and aggregated micellar morphologies in the VES fluids. The VES-enhancing additives might have, through van der Waals forces, simultaneously attached to multiple VES micelles in the fluids, thus strengthening the 3-dimensional network of the VES micelles. This way, the overall fluid viscosity could be increased. The addition of nanoparticle viscosity modifiers increases the viscosity of the VES fluid and lowers the amount of VES needed.

Nanoparticle viscosity modifiers include nanomaterials, that is, materials having unit sizes on the scale of one to one hundred nanometers (nm). Nanomaterials include, by way of non-limiting example, nanoparticles, nanotubes, nanorods, nanodots, or combinations thereof. In one or more embodiments, a nanoparticle viscosity modifier comprises carbon nanotubes, carbon nanorods, ZnO, $ZrO_2$, $TiO_2$, compounds of Zr, Ti, Ce, Al, B, Sn, Ca, Mg, Fe, Cr, Si, or combinations thereof. In some embodiments, the nanoparticle viscosity modifier may be nonpolymeric.

In one or more embodiments, the VES fluid comprises from 0.001 wt. % to 5 wt. % nanoparticle viscosity modifier. In other embodiments, the VES fluid comprises from 0.01 wt. % to 3 wt. %; from 0.01 wt. % to 1.5 wt. %; from 0.01 wt. % to 1 wt. %; from 0.03 wt. % to 1 wt. %; or from 0.05 wt. % to 1 wt. % nanoparticle viscosity modifier.

Polymeric viscosity modifiers may comprise polyacrylamide homopolymers or copolymers with near zero amounts of acrylate groups; a polyacrylamide polymer or copolymer with a mixture of acrylate groups and acrylamide groups formed by hydrolysis; or copolymer comprising acrylamide, acrylic acid, or other monomers.

A polyacrylamide has functional groups selected from at least one member of a group comprising carboxylate, sulfate, sulfonate, phosphate, or phosphonate. The substituted polyacrylamide may have more than one functional group selected from at least one member of a group comprising carboxylate, sulfate, sulfonate, phosphate, or phosphonate.

In one or more embodiments, the VES fluid may be enhanced with polymeric viscosity modifiers to increase the viscosity of the VES fluid. Without being limited by theory, it is believed the selected polyacrylamides may have interacted with multiple VES micelles in the fluid, through van der Waals forces. This strengthens the three dimensional network of VES micelles. A stronger three dimensional network results in an increased viscosity. The addition of polymeric viscosity modifiers increases the viscosity of the VES fluid and lowers the amount of VES needed.

In one or more embodiments of this disclosure, the polymeric viscosity modifier has a weight averaged molecular weight ($M_w$) of from 250,000 g/mol to 40,000,000 g/mol. In other embodiments, the polymeric viscosity modifier has a $M_w$ of from 2,000,000 g/mol to 8,000,000 g/mol.

In some embodiments, additional surfactants may be added to the VES fluid. Adding additional surfactant or surfactants may increase the viscosity or enhance the three dimensional micelle network at varying temperatures, pressures, or other various wellbore conditions. Such surfactants, by way of non-limiting example, may include cationic surfactants, anionic surfactants, nonionic surfactants, amphoteric surfactants, zwitterionic surfactants, or combinations thereof.

EXAMPLES

In the subsequent examples, VES fluids are made from either naturally occurring seawater or desulfated seawater. The naturally occurring seawater was obtained from the Arabian Gulf. Seawater from other locations worked similarly. The dissolved solids content of the naturally occurring seawater is listed in Table 1.

TABLE 1

| Solute | Concentration |
| --- | --- |
| Boron | <1 mg/L |
| Barium | <1 mg/L |
| Calcium | 618 mg/L |
| Iron | <1 mg/L |
| Magnesium | 2,108 mg/L |
| Potassium | 595 mg/L |
| Silicon | <1 mg/L |
| Sodium | 18,451 mg/L |
| Strontium | 11 mg/L |
| Chloride | 30,694 mg/L |
| Sulfate | 4,142 mg/L |
| Carbonate | <1 mg/L |
| Bicarbonate | 150 mg/L |
| Total Dissolved Solids | 56,800 mg/L |

The desulfated seawater was produced by adding calcium chloride to naturally occurring seawater. $CaCl_2$ was added to the seawater at a rate of 0.334 kilograms of $CaCl_2$ per liter of the $CaCl_2$-added seawater (i.e., per liter of the seawater volume after the addition of the $CaCl_2$). The resulting solution would have a $Ca^{2+}$ concentration of 3.02 M if there had been no sulfate ions in the seawater. From the calculation shown below, only a very small portion of Ca ions were "consumed" to form $CaSO_4$ precipitate, while most of the Ca ions were still in the solution with a concentration very close to 3 M.

According to some references (for example, D. R. Linde (ed.), "CRC Handbook of Chemistry and Physics", 83rd Edition, CRC Press, 2002), the $K_{sp}$ of $CaSO_4$ is $4.93 \times 10^{-5} M^2$, where $K_{sp}=[Ca^{2+}][SO_4^{2-}]$. According to the solubility expression of $CaSO_4$, if the concentration of $Ca^{2+}$ is greater than 3 M, then the concentration of $SO_4^{2-}$ cannot exceed $1.63 \times 10^{-5}$ M. Therefore, the desulfated seawater solution with a calcium concentration greater than 3 M must have a sulfate concentration less than $1.64 \times 10^{-5}$ M (or less than about 2 mg/L of sulfate). This is compared to naturally occurring seawater which, according to Table 1, has a calcium concentration of approximately $1.54 \times 10^{-2}$ M and a sulfate concentration of approximately $4.31 \times 10^{-2}$ M.

Example 1 and Comparative Example A comprise formation water. That is, water taken from the formation surrounding a wellbore. The dissolved solids content of the formation water is detailed in Table 2.

TABLE 2

| Solute | Concentration |
| --- | --- |
| Sodium | 78,100 mg/L |
| Potassium | 3,889 mg/L |
| Magnesium | 1,830 mg/L |
| Calcium | 24,900 mg/L |
| Strontium | 2,000 mg/L |
| Barium | 3,832 mg/L |
| Chloride | 160,000 mg/L |
| Sulfate | 190 mg/L |

Example 1

Example 1 was prepared by combining 80 vol. % desulfated seawater with 20 vol. % formation water. The resulting solution was left to rest for seven days at 300° F. The solution was photographed on the first day and on the seventh day. The photograph from the first day is shown in FIG. 1A and the photograph from the seventh day is shown in FIG. 1C.

Comparative Example A

Comparative Example A was prepared by combining 80 vol. % natural seawater (not treated) with 20 vol. % formation water. The resulting solution was left to rest for seven days at 300° F. The solution was photographed on the first day and on the seventh day. The photograph from the first day is shown in FIG. 1B and the photograph from the seventh day is shown in FIG. 1D.

Figure 1:
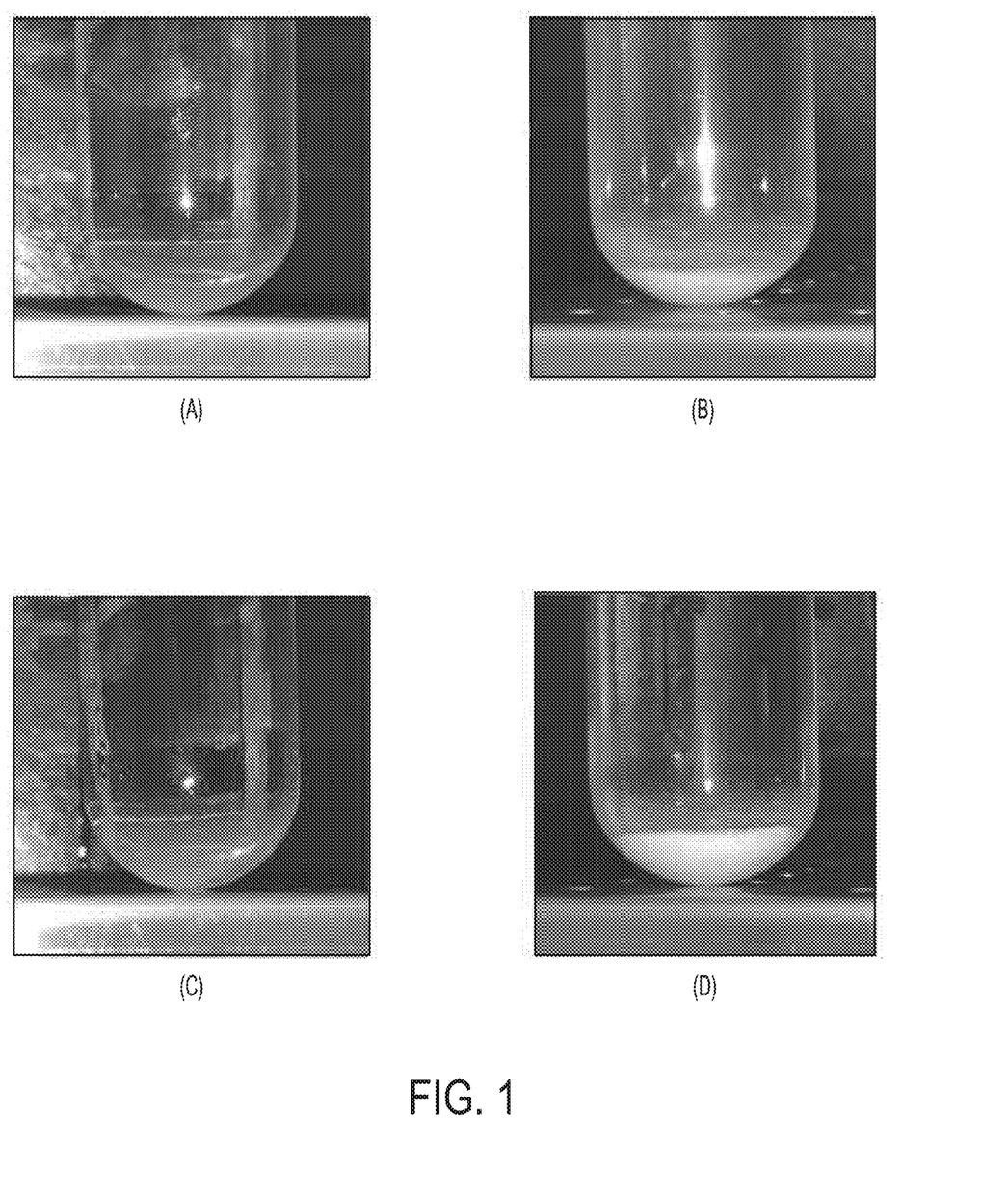
FIG. 1 is a comparison of four photographs of natural seawater and desulfated seawater mixed with formation water: (a) shows a solution that is 80 percent by total volume (vol. %) of desulfated seawater and 20 vol. % formation water that had been resting at 300° F. for one day; (b) shows a solution that is 80 vol. % natural seawater and 20 vol. % formation water that had been resting at 300° F. for one day; (c) shows a solution that is 80 percent by total vol. % desulfated natural seawater and 20 vol. % formation water that had been resting at 300° F. for seven days; (d) shows a solution that is 80 percent by total vol. % natural seawater and 20 vol. % formation water that had been resting at 300° F. for seven days.

As can be seen from FIG. 1, a white precipitate appeared in Comparative Example A, but not in Example 1. The amount of precipitate in Comparative Example A increased over seven days, while no precipitate developed in Example 1 after seven days. This demonstrates that the use of desulfated seawater in Example 1 is capable of preventing the formation of scales like $BaSO_4$ scale.

The viscosities of two VES fluids made with desulfated water were compared at 350° F. for over 110 minutes. The viscosities were measured by API RP 39 using a Fann50-type viscometer.

Comparative Example B

Comparative Example B was prepared by combining 50 milliliters (mL) of desulfated seawater with 2.5 mL of VES. The viscosity of Comparative Example B was measured with a Fann50 viscometer by API RP 39. These viscosity measurements are shown in FIG. 2.

Example 2

Example 2 was prepared by adding 0.5 grams (g) of a hydrophobically modified anionic-polyacrylamide terpolymer, commercially available under the tradename FP9515SH by SNF Floerger, to Comparative Example B. The viscosity of Example 2 was measured with a Fann50 viscometer by API RP 39. These viscosity measurements are shown in FIG. 2.

Figure 2:
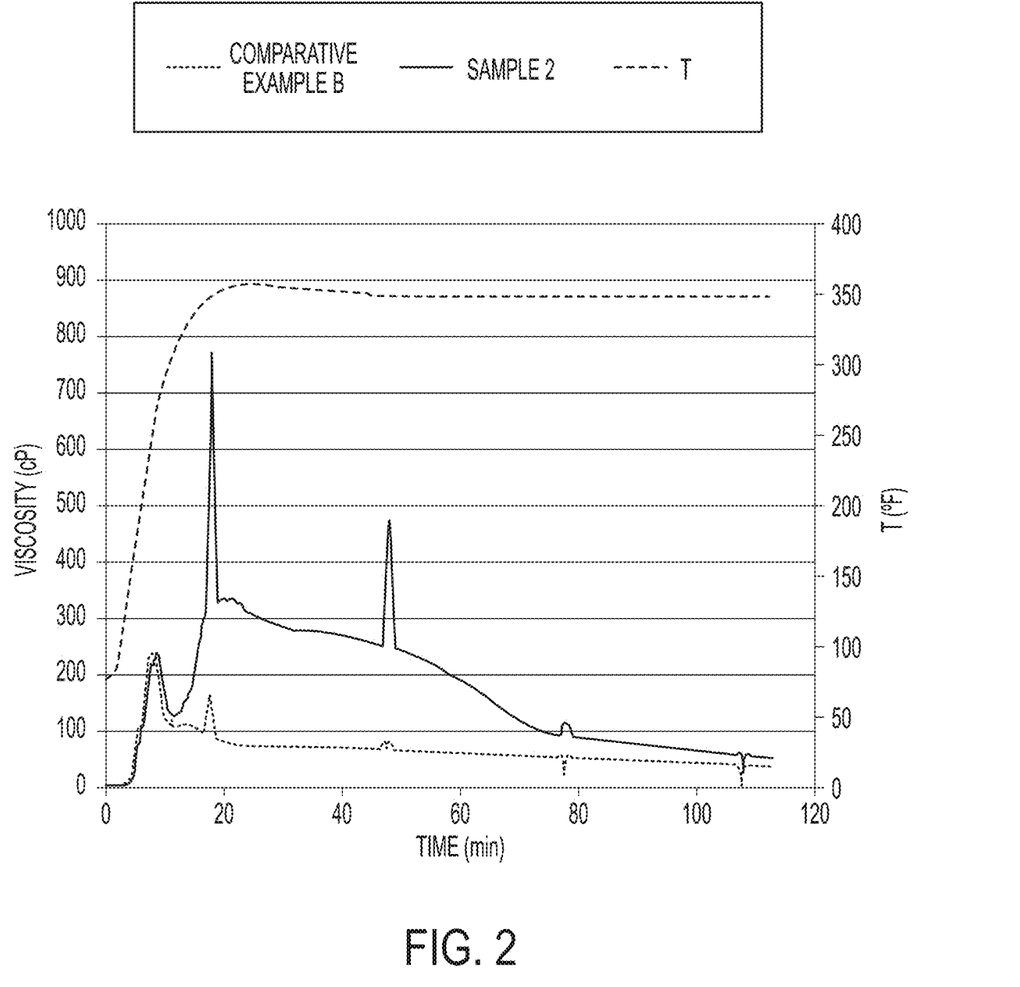
FIG. 2 is a graphical depiction of viscosity-temperature curve illustrating: (i) a VES fluid without a nanoparticle viscosity modifier or polymeric viscosity modifier and (ii) a VES fluid comprising about 79 pounds of an anionic polyacrylamide polymer per thousand gallons (ppt) of VES fluid.

As can be seen from FIG. 2, Example 2 had a greater viscosity than Comparative Example B over all temperatures greater than or equal to 300° F. Further, the viscosity of Example 2 never dropped below 10 cP. After the first shear ramp, Example 2 had a viscosity 3.8 times that of Comparative Example B. After the second shear ramp, Example 2 had a viscosity 3.6 times that of Comparative Example B. After 60 minutes, Example 2 had a viscosity 3.0 times that of Comparative Example B. The viscosity of the VES fluid containing the polyacrylamide terpolymer maintained a greater velocity at temperatures above 250° F. than the VES fluid without the polyacrylamide.

Example 3

Example 3 was prepared by adding 12 ppt (1 ppt=0.12 grams per liter) of multi-walled carbon nanotubes to Comparative Example B. The carbon nanotubes were purchased commercially from Cheap Tubes Inc. and 95 percent by weight of the carbon nanotubes have a length of from 30 nm to 50 nm.

The viscosity of Example 3 was measured with a Fann50-type viscometer from room temperature to about 350° F., at the shear rate of 100 s$^{-1}$. The fluid viscosity of Example 3 was about 140 cP (at the shear rate of 100 s$^{-1}$) at about 350° F. In another test, the fluid viscosity of Comparative Example B was about 90 cP at a shear rate of 100 s$^{-1}$. The viscosity enhancement due to the carbon nanotubes was therefore over 50% at 350° F.

The subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

A first aspect of the disclosure is directed to a method of producing a viscoelastic surfactant fluid comprising desulfated seawater, the method comprising: adding an alkaline earth metal halide to seawater to produce a sulfate precipitate; removing the sulfate precipitate to produce the desulfated seawater; adding a viscoelastic surfactant, and one or more of a nanoparticle viscosity modifier or a polymeric viscosity modifier to the desulfated seawater to produce the viscoelastic surfactant fluid, where the viscoelastic surfactant has the general formula:

where R1 is a saturated or unsaturated hydrocarbon group of from 17 to 29 carbon atoms, R2 and R3, are each independently selected from a straight chain or branched alkyl or hydroxyalkyl group of from 1 to 6 carbon atoms, R4 is selected from H, hydroxyl, alkyl or hydroxyalkyl groups of from 1 to 4 carbon atoms; k is an integer of from 2-20; m is an integer of from 1-20; and n is an integer of from 0-20.

A second aspect of the disclosure is directed to a method of the first aspect, where the alkaline earth metal halide comprises calcium halide.

A third aspect of the disclosure is directed to a method of the first or second aspect where the alkaline earth metal halide comprises $CaCl_2$.

A fourth aspect of the disclosure is directed to a method of any of the first through third aspects where the sulfate precipitate comprises $CaSO_4$ precipitate.

A fifth aspect of the disclosure is directed to a method of any of the first through fourth aspects where the polymeric viscosity modifier comprises polyacrylamide viscosity modifier.

A sixth aspect of the disclosure is directed to a method of any of the first through fifth aspects where the removing step comprises filtration, centrifuging, flocculation, agglomeration, coagulation, coalescence, or combinations thereof.

A seventh aspect of the disclosure is directed to a method of any of the first through sixth aspects where CaO is added with the alkaline earth metal halide to produce a sulfate precipitate.

An eighth aspect of the disclosure is directed to a method of any of the first through seventh aspects where the viscoelastic surfactant comprises erucamidopropyl hydroxypropylsultaine.

A ninth aspect of the disclosure is directed to a method of any of the first through eighth aspects where the viscoelastic surfactant fluid comprises from 0.1 vol. % to 20 vol. % of viscoelastic surfactant.

A tenth aspect of the disclosure is directed to a method of any of the first through ninth aspects where the polymeric viscosity modifier comprises nonionic polyacrylamides, acrylamide copolymers, polyacrylamide-based terpolymers, polyacrylamide-based tetra-polymers, hydrophobically modified acrylamide-based polymers, or combinations thereof.

An eleventh aspect of the disclosure is directed to a method of any of the first through tenth aspects where the polymeric viscosity modifier has a weight average molecular weight of from 250,000 g/mol to 40,000,000 g/mol, more preferentially from 2,000,000 g/mol to 8,000,000 g/mol.

A twelfth aspect of the disclosure is directed to a method of any of the first through eleventh aspects where the nanoparticle viscosity modifier is nonpolymeric.

A thirteenth aspect of the disclosure is directed to a method of any of the first through twelfth aspects where the nanoparticle viscosity modifier comprises carbon nanotubes, ZnO nanomaterials, $ZrO_2$ nanomaterials, $TiO_2$ nanoparticles, or combinations thereof.

A fourteenth aspect of the disclosure is directed to a method of any of the first through thirteenth aspects where the nanoparticle viscosity modifier comprises nanosized Zr compounds, Ti compounds, Ce compounds, Zn compounds, Al compounds B compounds, Sn compounds, Mg compounds, Fe compounds, Cr compounds, Si compounds, or combinations thereof.

A fifteenth aspect of the disclosure is directed to a method of any of the first through fourteenth aspects where the viscoelastic surfactant fluid comprises from 0.001 wt. % to 5 wt. % nanoparticle viscosity modifier.

A sixteenth aspect of the disclosure is directed to a viscoelastic surfactant fluid comprising a viscoelastic surfactant comprising the general formula:

where $R_1$ is a saturated or unsaturated hydrocarbon group of from 17 to 29 carbon atoms, $R_2$ and $R_3$, are each independently selected from a straight chain or branched alkyl or hydroxyalkyl group of from 1 to 6 carbon atoms, $R_4$ is selected from H, hydroxyl, alkyl or hydroxyalkyl groups of from 1 to 4 carbon atoms; k is an integer of from 2-20; m is an integer of from 1-20; and n is an integer of from 0-20; at least one nanoparticle viscosity modifier comprising a particle size of 0.1 to 500 nanometers; desulfated seawater; and at least one stabilizing calcium salt.

A seventeenth aspect of the disclosure is directed to a viscoelastic surfactant fluid comprising: a viscoelastic surfactant comprising the general formula:

where $R_1$ is a saturated or unsaturated hydrocarbon group of from 17 to 29 carbon atoms, $R_2$ and $R_3$, are each independently selected from a straight chain or branched alkyl or hydroxyalkyl group of from 1 to 6 carbon atoms, $R_4$ is selected from H, hydroxyl, alkyl or hydroxyalkyl groups of from 1 to 4 carbon atoms; k is an integer of from 2-20; m is an integer of from 1-20; and n is an integer of from 0-20; at least one polymeric viscosity modifier with a weight average molecular weight of from 250,000 g/mol to 40,000,000 g/mol; desulfated seawater; and at least one stabilizing calcium salt.

An eighteenth aspect of the disclosure includes either the sixteenth or seventeenth aspects where the viscoelastic surfactant comprises erucamidopropyl hydroxypropylsultaine.

A nineteenth aspect of the disclosure includes any of the sixteenth through eighteenth aspects where the viscoelastic surfactant fluid comprises from 0.1 vol. % to 20 vol. % of viscoelastic surfactant.

A twentieth aspect of the disclosure includes any of the sixteenth through nineteenth aspects where the viscoelastic surfactant fluid comprises from 1 wt. % to 50 wt. % of at least one stabilizing calcium salt.

A twenty-first aspect of the disclosure includes any of the seventeenth through twentieth aspects where the polymeric viscosity modifier comprises nonionic polyacrylamides, acrylamide copolymers, polyacrylamide-based terpolymers, polyacrylamide-based tetra-polymers, hydrophobically modified acrylamide-based polymers, or combinations thereof.

A twenty-second aspect of the disclosure includes any of the sixteenth through twenty-first aspects where the polymeric viscosity modifier has a weight average molecular weight of from 2,000,000 g/mol to 8,000,000 g/mol.

A twenty-third aspect of the disclosure includes any of the sixteenth or eighteenth through twentieth aspects where the nanoparticle viscosity modifier is nonpolymeric.

A twenty-fourth aspect of the disclosure includes any of the sixteenth, eighteenth through twentieth, or twenty-third aspects where the nanoparticle viscosity modifier comprises carbon nanotubes, ZnO nanomaterials, $ZrO_2$ nanomaterials, $TiO_2$ nanomaterials, or combinations thereof.

A twenty-fifth aspect of the disclosure includes any of the sixteenth, eighteenth through twentieth, or twenty-third through twenty-fourth aspects where the nanoparticle viscosity modifier comprises nanosized Zr compounds, Ti compounds, Ce compounds, Zn compounds, Al compounds B compounds, Sn compounds, Mg compounds, Fe compounds, Cr compounds, Si compounds, or combinations thereof.

A twenty-sixth aspect of the disclosure includes any of the sixteenth, eighteenth through twentieth, or twenty-third through twenty-fifth aspects where the viscoelastic surfactant fluid comprises from 0.001 wt. % to 5 wt. % nanoparticle viscosity modifier.

A twenty-seventh aspect of the disclosure includes any of the sixteenth, eighteenth through twentieth, or twenty-third through twenty-sixth aspects where the viscoelastic fluid has a viscosity greater than or equal to 10 cP at a temperature greater than or equal to 300° F.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

It will be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

What is claimed is:

1. A method of producing a viscoelastic surfactant fluid comprising desulfated seawater, the method comprising:
   adding an alkaline earth metal halide to seawater to produce a sulfate precipitate comprising $CaSO_4$ precipitate;
   removing the sulfate precipitate to produce the desulfated seawater;
   adding a viscoelastic surfactant, and one or more of a nanoparticle viscosity modifier or a polymeric viscosity modifier to the desulfated seawater to produce the viscoelastic surfactant fluid, where the viscoelastic surfactant has the general formula:
   where $R_1$ is a saturated or unsaturated hydrocarbon group of from 17 to 29 carbon atoms, $R_2$ and $R_3$, are each independently selected from a straight chain or branched alkyl or hydroxyalkyl group of from 1 to 6 carbon atoms, $R_4$ is selected from H, hydroxyl, alkyl or hydroxyalkyl groups of from 1 to 4 carbon atoms;

k is an integer of from 2-20; m is an integer of from 1-20; and n is an integer of from 0-20.

2. A method of claim 1, where the alkaline earth metal halide comprises calcium halide.

3. A method of claim 1, where the alkaline earth metal halide comprises $CaCl_2$.

4. A method of claim 1, where the polymeric viscosity modifier comprises polyacrylamide viscosity modifier.

5. A method of claim 1, where the removing step comprises filtration, centrifuging, flocculation, agglomeration, coagulation, coalescence, or combinations thereof.

6. A method of claim 1, where CaO is added with the alkaline earth metal halide to produce a sulfate precipitate.

7. A method of claim 1, where the viscoelastic surfactant comprises erucamidopropyl hydroxypropylsultaine.

8. A method of claim 1, where the viscoelastic surfactant fluid comprises from 0.1 vol. % to 20 vol. % of viscoelastic surfactant.

9. A method of claim 1, where the polymeric viscosity modifier comprises nonionic polyacrylamides, acrylamide copolymers, polyacrylamide-based terpolymers, polyacrylamide-based tetra-polymers, hydrophobically modified acrylamide-based polymers, or combinations thereof.

10. A method of claim 1, where the polymeric viscosity modifier has a weight average molecular weight of from 250,000 g/mol to 40,000,000 g/mol, more preferentially from 2,000,000 g/mol to 8,000,000 g/mol.

11. A method of claim 1, where the nanoparticle viscosity modifier is nonpolymeric.

12. A method of claim 1, where the nanoparticle viscosity modifier comprises carbon nanotubes, ZnO nanomaterials, $ZrO_2$ nanomaterials, $TiO_2$ nanoparticles, or combinations thereof.

13. A method of claim 1, where the nanoparticle viscosity modifier comprises nanosized Zr compounds, Ti compounds, Ce compounds, Zn compounds, Al compounds B compounds, Sn compounds, Mg compounds, Fe compounds, Cr compounds, Si compounds, or combinations thereof.

14. A method of claim 1, where the viscoelastic surfactant fluid comprises from 0.001 wt. % to 5 wt. % nanoparticle viscosity modifier.

* * * * *